D. R. SLOCUM.
SPONGE RAISING APPARATUS.
APPLICATION FILED NOV. 5, 1917.

1,277,496.

Patented Sept. 3, 1918.

INVENTOR
Daniel R Slocum
By Lancaster and Allwine
his ATTORNEYS

UNITED STATES PATENT OFFICE.

DANIEL R. SLOCUM, OF SPENCERPORT, NEW YORK.

SPONGE-RAISING APPARATUS.

1,277,496.

Specification of Letters Patent.

Patented Sept. 3, 1918.

Application filed November 5, 1917. Serial No. 200,405.

*To all whom it may concern:*

Be it known that I, DANIEL R. SLOCUM, a citizen of the United States, and a resident of Spencerport, in the county of Monroe and State of New York, have invented a certain new and useful Improvement in Sponge-Raising Apparatus, of which the following is a specification.

My present invention relates to apparatus for the raising of sponge used in the making of bread, by the utilization of artificial heat.

The principal objects of my invention are to provide apparatus of the character described which is compact and easily manipulated; apparatus which will receive the usual container for a batch of sponge, such as is used in households, by campers, or where a supply of bread is to be provided for a small group of persons; and, to provide apparatus of the character described which may be adjusted according to the atmospheric conditions or temperature, so as to prevent the sponge from becoming chilled, which usually results in souring of the dough and rendering it unfit for the purpose of making bread therefrom.

Another object of my invention is to provide apparatus of the character described capable of utilizing a low grade of oil in lamps for the purpose of providing heat, but preventing the fumes issuing from the lamp from coming in contact with the sponge.

Further objects of my invention will appear in the following detailed description, taken in connection with the accompanying drawing, forming a part of this specification, and in which drawing:—

Figure 1:
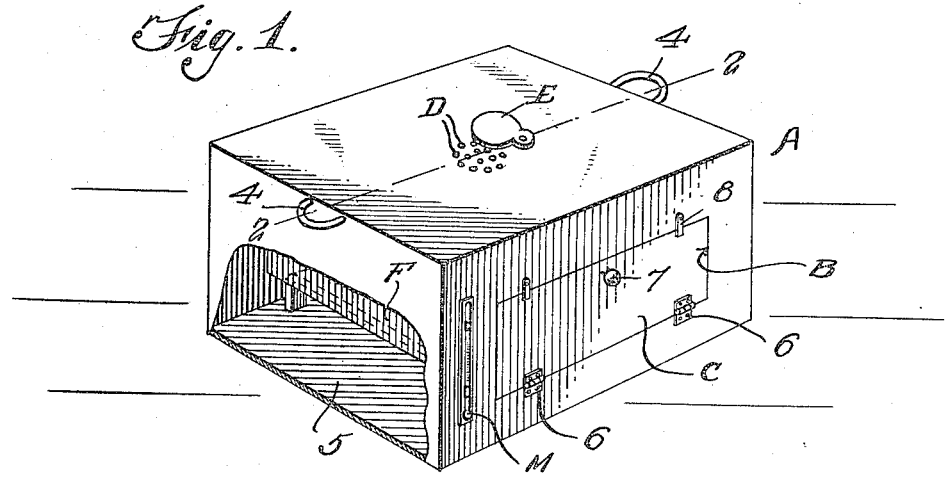
Figure 1 is a perspective view of apparatus constructed according to my invention, a part of one side wall being broken away to disclose details.
Figure 2:
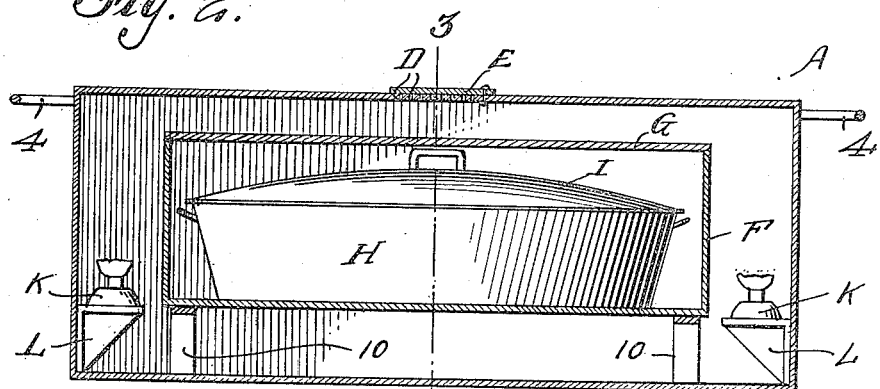
Fig. 2 is a central vertical sectional view through the apparatus.

In the drawing, where similar characters refer to similar parts throughout the views, A designates an outer container formed with an opening B, normally closed by a door C, in its side wall and gas outlet D in the top, controlled by means of a shutter E; F an inner container of a size to fit the opening B when extending thereinto, so as to prevent the escape of gas about said opening, the container F including a lid G; H a pan for the sponge which may be provided with a lid I; J means for supporting the container F in spaced relation to the bottom of container A; K, heating devices, such as lamps; L supports for the devices K; and, M, a thermometer.

Referring first to the container A, it is preferably made of metal and may be provided with handles 4 extending from opposite sides, facilitating transportation of the apparatus. The lower margin of opening B is preferably at a substantial distance from the bottom 5 of the container, the door C being preferably hinged so as to swing about hinges 6, the pintles of which are longitudinally of and adjacent the lower margin of the opening. A knob 7 may be secured to the door C and catches 8 may be provided adapted to retain the door in a closed position.

The container F is also preferably made of metal, and may be provided with a handle 9 extending from the front wall thereof, facilitating the placing in or removal of the container from the hollow of container A. The lid G is pivotally connected with the main body portion of the container so as to swing about an axis adjacent the rear margin of the container. It is to be observed that container F is of a cross section substantially the size of opening B so that as said container is being drawn from the hollow of container A, it will substantially close the opening B, preventing egress of heated air from the container A through said opening. The container F may also be drawn sufficiently to permit the lid G to be swung upwardly, without entirely freeing the container F from its engagement with the walls of opening B,—this for the purpose of placing or removing the pan H or for gaining access to the hollow of container F, for the purpose of removing lid I to determine the condition of the batch of sponge within the pan.

Figure 3:
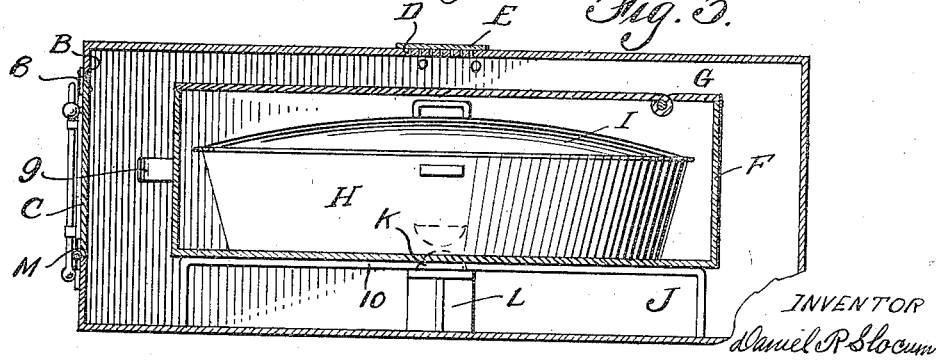
Fig. 3 is a sectional view on the line 3—3 of Fig. 2.

Referring to the means J, it preferably comprises a plurality of pieces of metal 10, such as strap iron, in spaced relation supported within the container A, preferably from the bottom 5 thereof, and horizontally alined at their upper faces with the lower margins of the opening B. Thus, in placing the container F within the container A, it may be primarily rested upon the lower margin of opening B and then forced inwardly of container A so as to rest upon the strips of material 10, as is clearly shown in Fig. 3 of the drawing.

The devices K, preferably in the form of lamps may be of any suitable construction, and in the example shown, are disposed laterally of the container F, one at each side thereof, and supported by brackets L, secured to the inner sides of container A, these brackets disposing the devices K so that they may be placed or removed by forcing the container F to engage the rear wall of container A.

The thermometer M is provided to determine the temperature adjacent the apparatus, and the operator becomes accustomed to the amount of heat required to give warmth to the batch of sponge within the pan H. This adjustment may be accomplished by either manipulating the devices K so that the heat given off therefrom is just sufficient to maintain the desired temperature within the container A, or by moving the shutter E so as to permit free passage of gas from the container A through perforations D and whereby any excess heat will escape from the container.

It is to be observed that none of the fumes issuing from devices K will find their way to within the pan H. If it is desired to determine the condition of the sponge within pan H, the door C may be opened and the container F quickly drawn so as to close the opening B by the container extending therethrough. The container F may be drawn outwardly a distance sufficient to permit the lid G to swing freely, so as to gain access to the interior of the container, and whereupon the lid I of pan H may be raised disposing the batch of sponge to view.

From the foregoing, it is made manifest that I have provided apparatus well adapted for use in cold climates or where dampness is apt to chill the batch of sponge; and that the apparatus is compact, and easily manipulated.

Changes in details may be made without departing from the spirit or scope of my invention; but,

I claim:—

1. In a sponge raising device, the combination of an outer container having an opening in one side and door for closing the opening, an inner container adapted to snugly pass through the opening and being reduced in size sufficient to form a space between the containers extending entirely about the inner container when in place, a support in the bottom of the outer container having supporting surface substantially in the plane of the lower edge of the opening to support the inner container in line with the opening, the support being of open construction to admit free passage of air beneath the inner container, and heating means in said space for heating and effecting the circulation of air about the inner container, the inner container being adapted to be slid on said support to project through said opening to gain access to the inner container and adapted to seal the opening to prevent egress of heated air from said place.

2. In a sponge raising device, the combination of an outer container having an opening in one side and a door closing the opening, an inner container adapted to snugly pass through the opening and being reduced in size sufficient to form an annular space between the container when the inner container is in place, a support in the bottom of the outer container for the inner container to hold it in line with said opening, said inner container having a top cover hinged in spaced relation to the inner end of the inner container and adapted to be swung into open position when the inner container is drawn forwardly over the support and through the opening to a limited extent whereby the inner container is adapted to seal said opening and prevent egress of heated air from the outer container, and a valve controlled vent in the top of the outer container for regulating the gradual egress of air from said space.

3. In a sponge raising device, the combination of an outer container having an opening in one side and a door for closing the opening, a horizontal support arranged in the bottom of the container and having a supporting surface substantially in the plane of the lower edge of the said opening, heating elements arranged in the opposite ends of the container, said container having perforations in its top, a valve controlling the passage of air and gas through the perforations, and an inner container adapted to snugly pass through the openings and adapted to engage said support for spacing the inner container from the inner walls of the outer container and forming an air circulating space entirely about the inner container, said inner container provided with a cover hinged thereto in spaced relation from the inner end of the inner container and adapted to be swung in open position when the inner container is drawn through said opening to a limited extent whereby the inner container is adapted to seal said opening and maintain heated air within the outer container while filling and emptying the inner container.

DANIEL R. SLOCUM.